Oct. 15, 1968 E. O. EKBERGH ETAL 3,406,259

SWITCHING CONTACT NETWORK HAVING COMMON MULTIPLE PRIMARY SWITCH MEANS

Filed April 6, 1965 8 Sheets-Sheet 2

Oct. 15, 1968 E. O. EKBERGH ET AL 3,406,259

SWITCHING CONTACT NETWORK HAVING COMMON MULTIPLE PRIMARY SWITCH MEANS

Filed April 6, 1965 8 Sheets-Sheet 5

United States Patent Office 3,406,259

Patented Oct. 15, 1968

3,406,259

SWITCHING CONTACT NETWORK HAVING COMMON MULTIPLE PRIMARY SWITCH MEANS

Evert O. Ekbergh, Hagersten, and Per G. Jonsson, Sorlid, Ronninge, Sweden, assignors to International Standard Electric Corporation Filed Apr. 6, 1965, Ser. No. 446,011
Claims priority, application Sweden, Apr. 10, 1964, 4,470/64
7 Claims. (Cl. 179—22)

ABSTRACT OF THE DISCLOSURE

A switching contact network for telephone systems. The network enables the establishment of different categories of calls, such as local calls, external calls and transit calls over a minimum number of contacts. The network is characterized in that the primary switching matrix provides individual common multiples to the subscribers. The common multiples are divided to enable switching between the subscribers and switching between the subscribers and trunks.

This invention refers in general to telephone switching systems and in particular to speech contact networks. The inventive networks enable establishment of different categories of calls, such as local calls, external calls and transit calls, using a minimum number of contacts.

Telephone engineers are constantly attempting to minimize the number of crosspoints or contacts required to interconnect calling and called equipment without limiting service or adversely affecting traffic.

Accordingly, it is an object of the present invention to provide switching networks serving a variety of categories of calls, such as local calls, external calls and transit calls using a minimum number of contacts.

A related object of the invention is to provide a telephone system switching network having individual multiples common to blocks of subscribers. In this way, the traffic between subscribers on the same blocks is handled over links internal to the blocks.

A further object of the invention is to provide a telephone system switching network that does not require a group selector stage.

In accordance with one embodiment of the invention, the speech switching network comprises a plurality of subscriber blocks provided with individual multiples that are common to the subscribers associated with the block.

The traffic between subscribers belonging to the same subscriber blocks mentioned above is handled over links internal to said blocks. On the other hand, calls between subscribers connected to different blocks are established over specific intermediate links with the possibility of overflow links if the several intermediate block links are occupied. If each subscriber block is provided with a common multiple (contact panel) of sufficient size the group selector stage common to telephone systems of current design can be avoided even for exchanges having very high final capacities. The external traffic and transit traffic are switched through in the same manner, wherein the intent is to occupy a minimum number of contacts.

Connecting registers, identifying, etc. can preferably be effected to the individual common multiples. The common multiples can also be utilized for direct connection of external trunks with trunk line calls.

By utilizing the reset principle, in which a register is connected over a local link and the call is forwarded over another link if the connection can not be completed over the link first selected, etc., it is possible to utilize the means connected to the common contact field to a maximum.

These and other objects, advantages and features of this invention, together with the manner of obtaining them will become more apparent and the invention itself will be best understood by making reference to the following description of two embodiments of the invention taken in conjunction with the accompanying drawings, in which.

Figure 4:
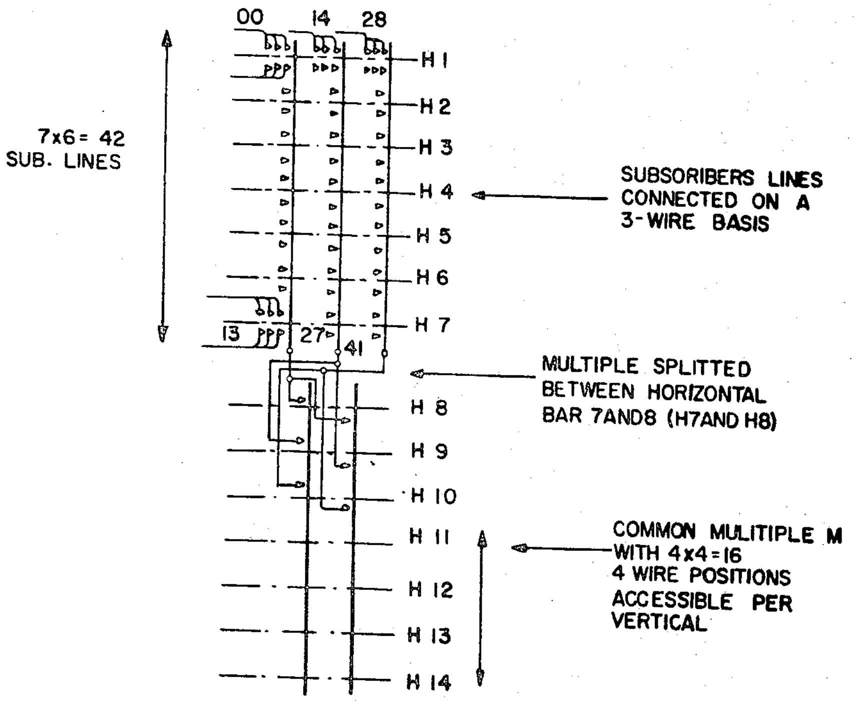
Figure 5:
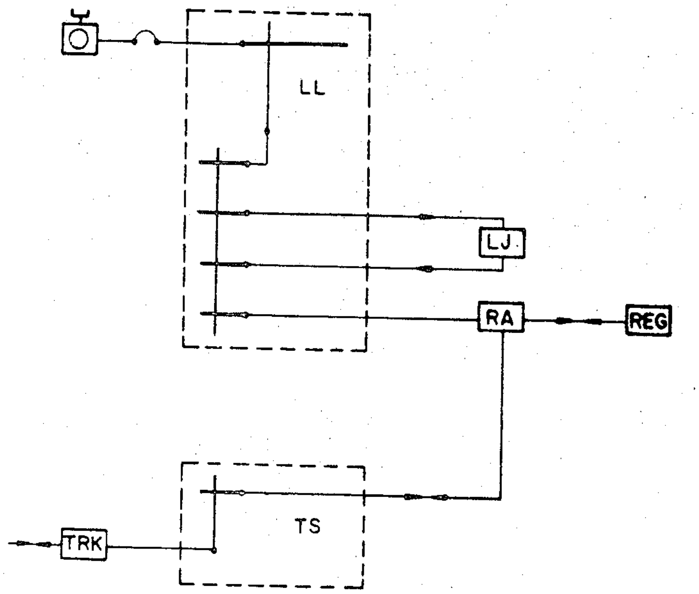
Figure 6:
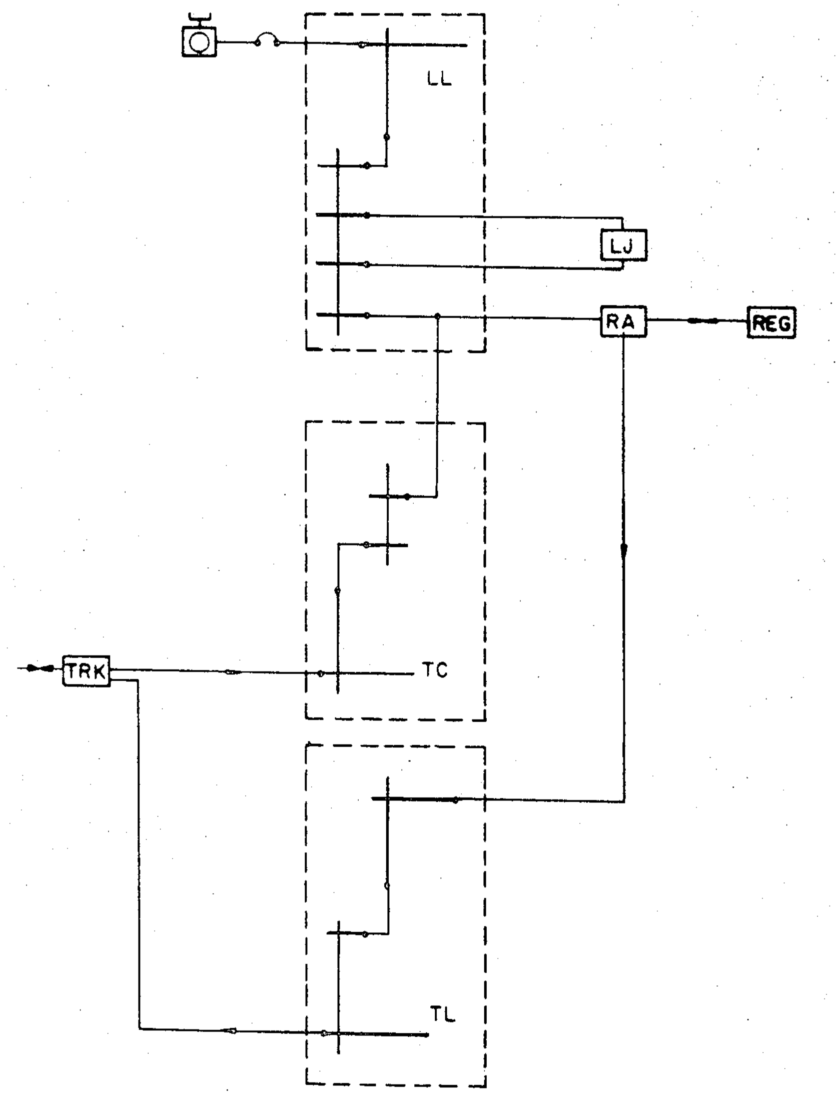
Figure 7:
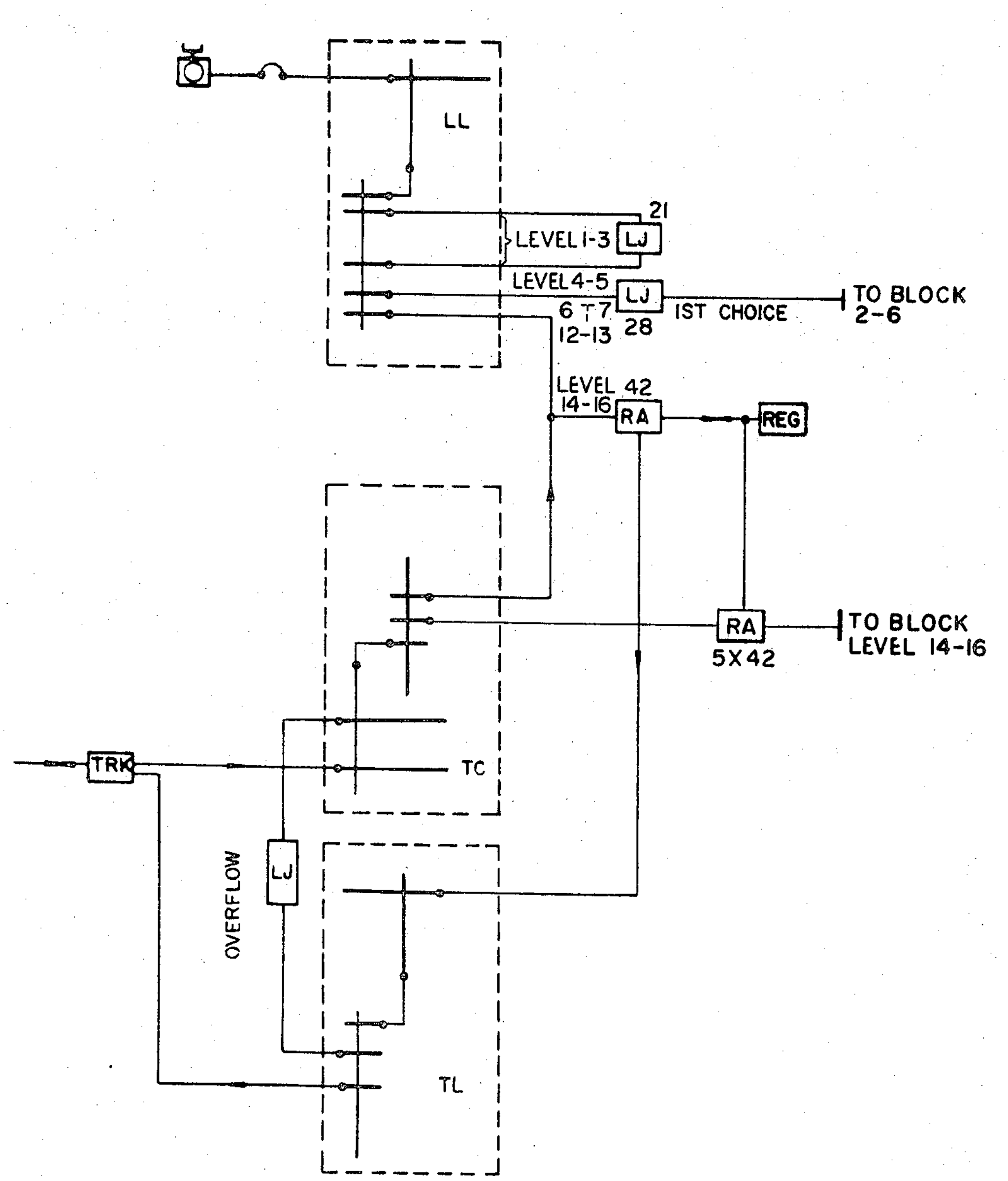
Figure 8:
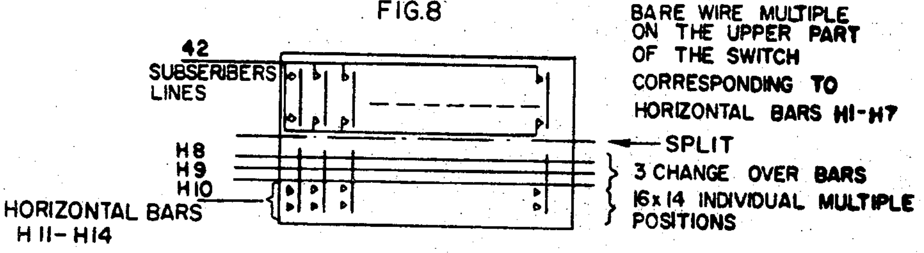
Figure 9:
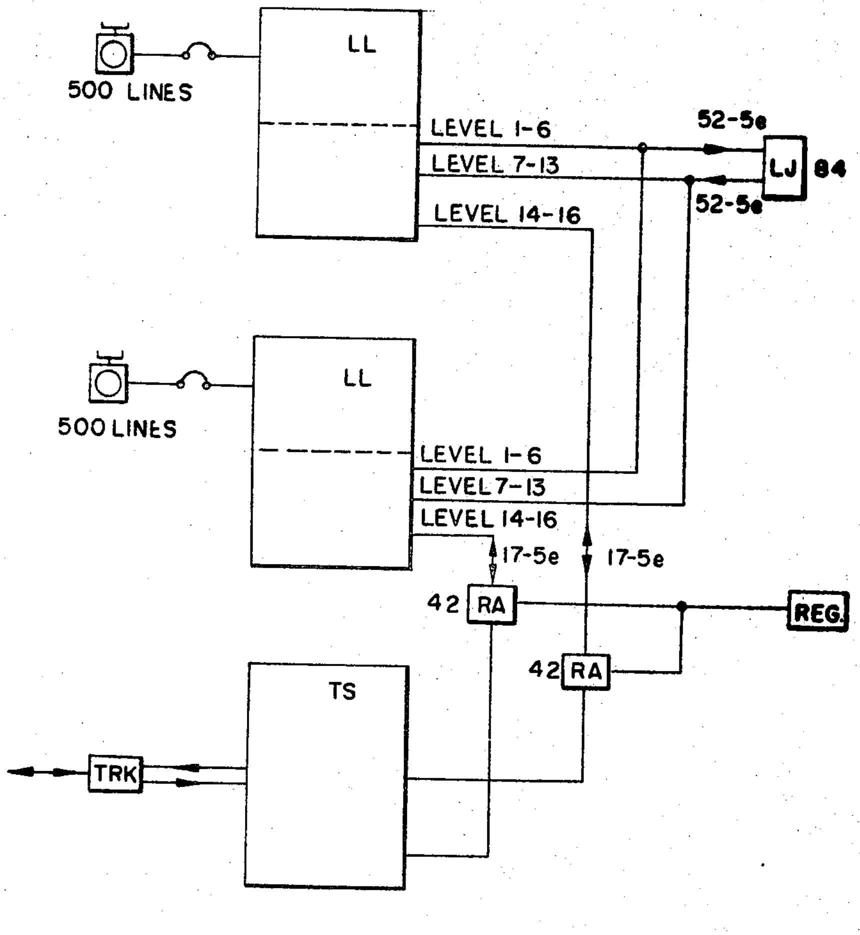

FIG. 4 schematically illustrates the inventive arrangement of the verticals of the line stage crossbar switch;

FIGS. 5–7 illustrate in block diagram form the circuitry used in establishing a call through the inventive network;

FIG. 8 schematically illustrates the connection of subscribers to verticals in a crossbar switch;

FIG. 9 illustrates the traffic capabilities of a 1000 line block; and

Figure 10:
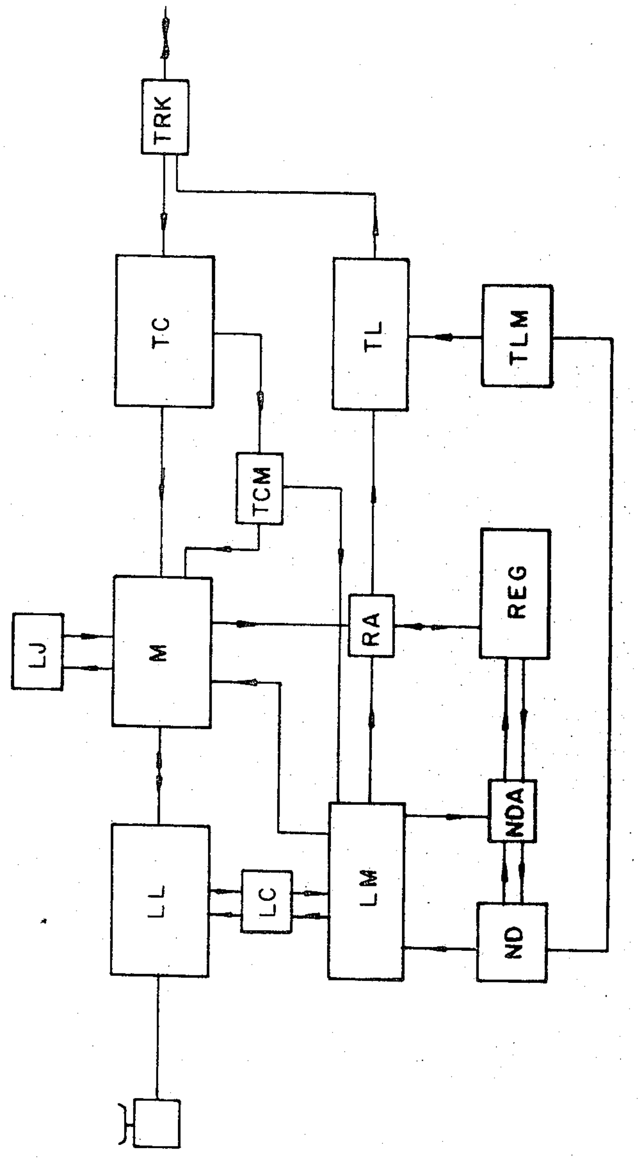
Figure 11:
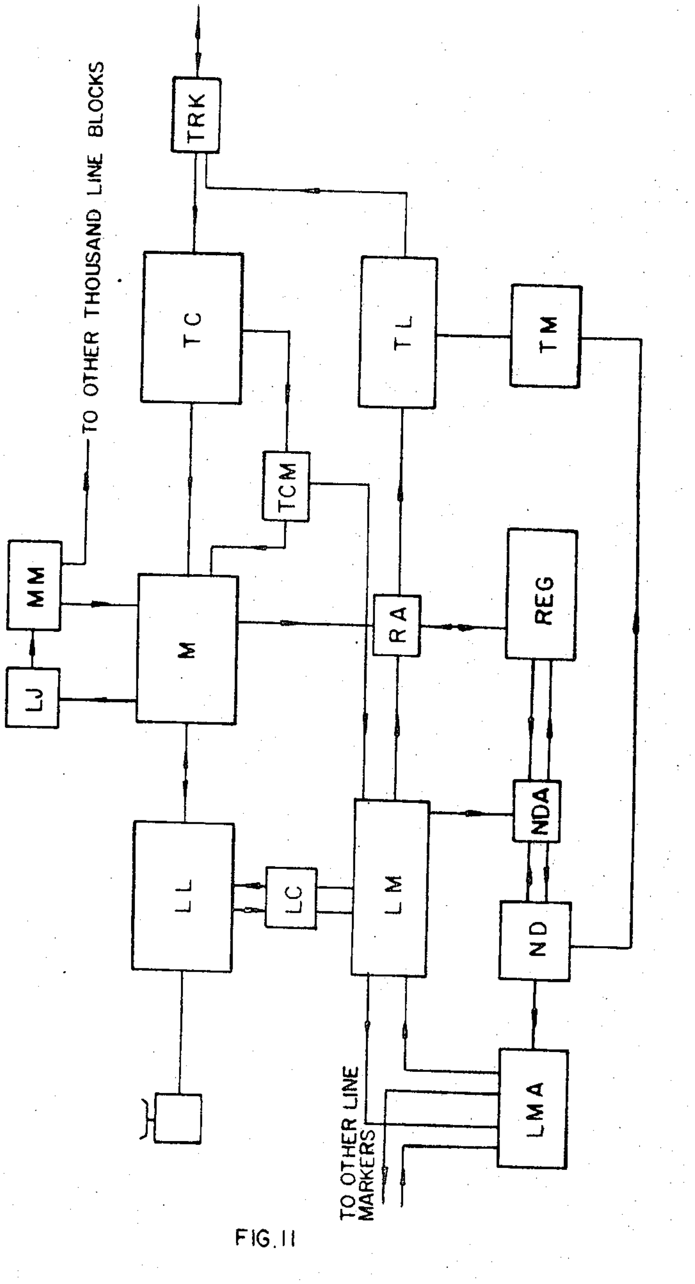

FIGS. 10 and 11 illustrate in block diagram form the main marker functions.

Figure 1:
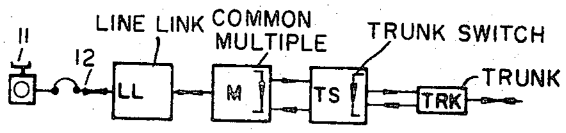
FIG. 1 illustrates the inventive speech contact network in block diagram form.

FIG. 1 shows diagrammatically a switching plan, in which the designation LL refers to a line link stage, M refers to the common multiple and TS refers to the trunk switch. TRK refers to the trunks. The subscriber station 11 is connected to the line link LL through the subscriber lines 12. Both subscriber lines and trunks are thus connected to a switching matrix with a large common multiple M located in the subscriber multiple and separated from the subscriber line portion by means of a division or split of the multiple. The switching matrix M is accessible to incoming trunk calls over a trunk switch matrix TS.

Figure 2:
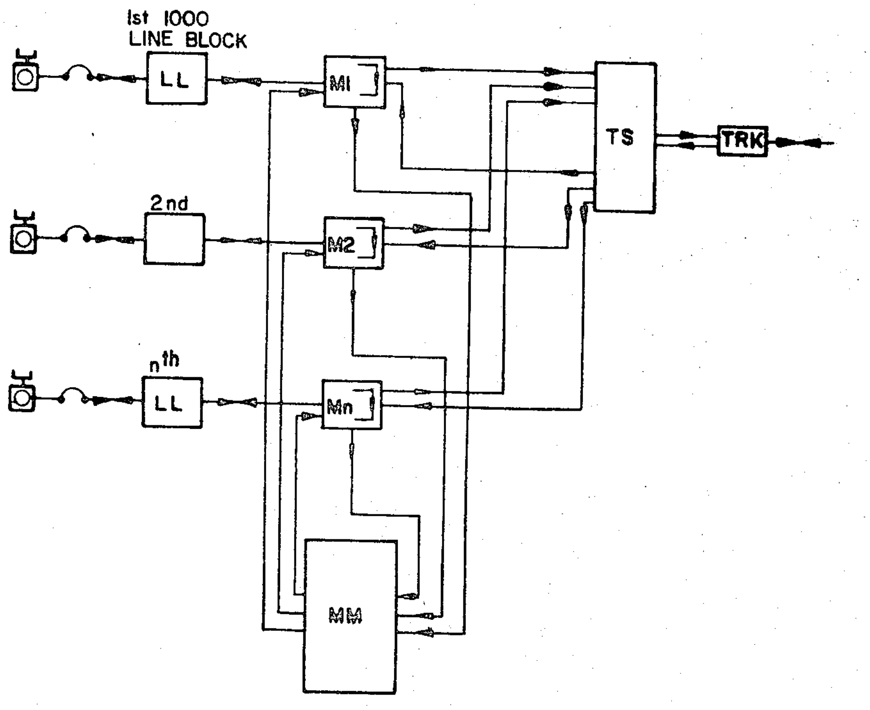
FIG. 2 illustrates in block diagram form a larger presently known speech contact network.

In this case, the common multiple can preferably be made large enough to handle internal and external traffic for up to 1,000 subscriber lines with 2.5 ccs. originating traffic. For greater capacities, a group selector stage MM (=mixing matrix) is added for handling the interblock traffic between the 1,000-line blocks. A switching plan for a large exchange of this type is shown in FIG. 2.

Figure 3:
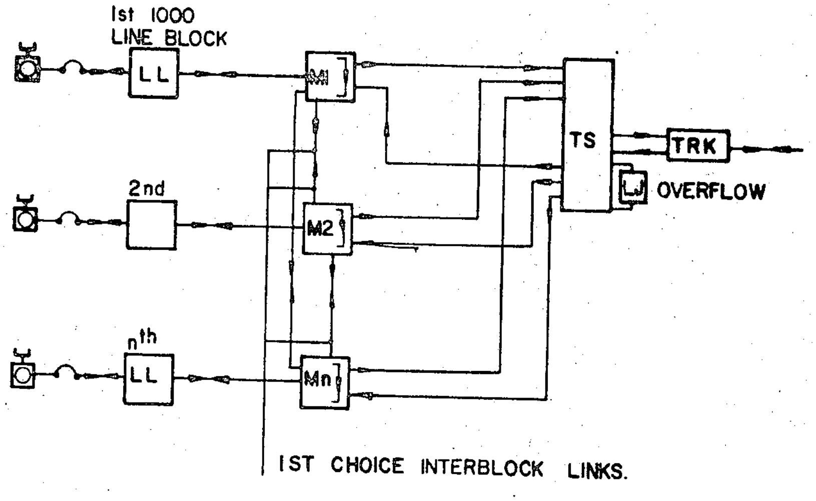
FIG. 3 illustrates in block diagram form an embodiment of the inventive network using links for the first selection between certain multiples and overflow links connected to the trunk multiple.

The trunk switch stage and the group selector stage can in this case be combined into one common matrix if desired. According to another alternative, links for first selection can be connected between multiples $M_1$, $M_2$ etc. and overflow links can be connected to the trunk multiple over the trunk selector stage TS. This is illustrated in FIG. 3.

The multiples of the verticals in a crossbar switch are arranged in the line stage LL in accordance with FIG. 4, which illustrates a three level selection of 42 subscribers and a two level selection of 16 multiple positions. This arrangement is based on a symmetrical splitting or division of the multiple between horizontal bars H7 and H8. The split could in principle be located between any of the horizontals H3–H10. However, a symmetrical split is considered to be the most advantageous as a great number of possibilities are obtained by varying the location of the switching bars. In the case shown in FIG. 3 all three switching bars are located in the lower portion of the split multiple.

The switching principles of the network in accordance with the invention will be described more in detail with reference to FIGS. 5–7, wherein FIG. 5 refers to a telephone exchange for 40–300 lines, FIG. 6 refers to an exchange for 300–1,000 lines, and FIG. 7 refers to an exchange having a capacity of more than 1,000 lines. All of the types illustrated can be used either as terminal exchanges or as junction centers.

The switching procedure will now be described with reference to FIG. 5. The subscribers are connected to the upper portion of the split multiple with a connecting capacity of 42 subscriber lines per vertical. For a traffic of 2.5 ccs. each individual subscriber must be connected to 12–14 verticals depending on permissible blocking. With 14 verticals the capacity of the common multiple located in the lower part of the split switch will be 14×16=224 positions distributed between 16 levels with 14 outlets in each. This arrangement is shown in FIG. 8. In the switch of FIG. 8 levels 1–4 are accessible over horizontal bar H11, levels 5–8 over horizontal bar H12, levels 9–12 over horizontal bar H13 and levels 13–16 over horizontal bar H14. The positions of the 16 levels form the common multiple M and $M_1$, $M_2$ . . . $M_n$ in FIGS. 1 and 2.

For exchanges with up to 1,000 lines it has now become possible to eliminate the group selector stage by making the connection over the common multiple M, which is common to all 40- or 42-groups of subscriber lines.

The levels of the multiple M can be disposed as follows:

Levels 1–6: 14×6=84 outlets for connecting the originating sides of the local links.

Levels 7–13: 84 (some positions duplicated) for connecting the terminating sides of the local links.

Levels 14–16: 14×3=42 for connecting the register access circuits RA.

Levels 1–13 are common to the whole 1,000 line block, whereas levels 14–16 are individual to each 500-line block. The traffic to be handled by a 1,000-line block with 25% external traffic is illustrated in FIG. 9. The 84 local links LL will then carry an average traffic of 52.5/84=0.625*e* local traffic, whereas the external traffic of 35*e* will be equally distributed between the two 500-line blocks, thus resulting in an average load per position of $$\frac{17.5+17.5}{2\times 42}=0.42e$$

Also for exchanges of 3,000 lines the traffic can be handled via the common multiples $M_1$, $M_2$ etc. by the introduction of interblock links and overflow links connected to the trunk stage. This arrangement is shown in FIG. 7. The levels in the multiples M can be disposed as follows:

Levels 1–3: 14×3=42 outlets for connecting 21 local junctors for traffic within one 500-line block.

14×2=28 outlets for connecting links for interblock traffic to 500-line groups No.—

| | Levels |
|---|---|
| **2** | **4–5** |
| **3** | **6–7** |
| **4** | **8–9** |
| **5** | **10–11** |
| **6** | **12–13** |

Levels 14–16: For connecting register access circuits RA.

The blocking in a call between subscribers connected to different 500-line blocks over the links first selected between said blocks (levels 4–5, 6–7, etc.) will be 2.5%, which means that only a very minor portion of the traffic would require the overflow connection via the trunk stage.

The diagram of FIG. 5 shows a simple switching arrangement with crossbar switch symbols for a terminal exchange of 40–300 subscriber lines. The incoming trunks are connected to individual verticals of the trunk switch stage TS, in the multiple of which the register access circuits RA are accessible. Any subscriber can be connected by these devices, which are connected to levels 13–16 of the common multiple.

Upon origination of a call, an idle register access circuit RA is connected and dial tone is extended from the register of the local exchange (or if desired from the parent exchange if blind occupation is permitted). In an outgoing call a trunk is seized, whereas resetting to a local link LL is effected in local calls.

If transit facilities are required, the trunk selector stage TS must be modified. This is shown in FIG. 6, wherein verticals split in the same manner as the line link stage LL are utilized. The trunk selector matrix has been split in two directions with a trunk connector TC for incoming traffic and a trunk link TL for outgoing traffic. In this manner, the necessary access to the register access circuits RA to permit transit traffic is obtained. A transit call is thus handled separately within the trunk stage matrix without the common multiple M being loaded additionally except with the blind occupation necessary during the register holding time when the register access circuit in question is marked busy.

The manner in which telephone exchanges with more than 1,000 lines and interblock traffic are arranged is shown in FIG. 7.

A traffic calculation has been carried out with reference to the switching network described above, wherein it has been proved that the assumptions made with respect to traffic handling capacity are correct. Thus the blocking from the calling line up to the register access circuits will be $4.54^0/_{00}$. The overall blocking on a call within the same block will be 1.2%.

The main marking principles will now be described with reference to FIGS. 10 and 11. FIG. 10 illustrates the switching matrix LL–M–TC/TL with the local junctor LJ and the trunk TRK as well as associated register and common control equipment. Herein LC designates a line marker connector individual to 126 lines, LM a line marker, one per 1,000 lines, RA register access circuits (the number depends on the traffic), REG registers (the number depends on the traffic), NDA number decoder access circuits, ND number decoding circuits, TCM trunk control marker and TLM trunk link marker.

*Local call*

When a call is originated, a line marker connector LC connects the line marker LM, which identifies the calling line. The line marker LM supervises the connection to an idle register REG over an appropriate register access circuit RA, which is reached via levels 14–16 in the common multiple M.

Dial tone is generated from the register. At a certain moment, the number decoder ND is consulated via the number decoder access circuit NDA. The information returned to the register is "local call," and the remaining digits are registered in the register. Thereafter the number decoder ND is called in a second time to determine the position of the called line in the line link stage LL. The line marker LM is connected and idled and an appropriate local junctor LJ is called in, whereafter the connection is established and ringing tone is sent from the local junctor LJ.

*Outgoing call*

After the first request from the register REG to the number decoder ND, the desired direction is indicated by the number decoder, which calls in a trunk marker TM for connecting an idle trunk TRK. The register outreading function is carried out in the normal manner, with a possibility of simultaneous in and outpulsing from the same register.

*Incoming call*

On an incoming call the register is connected via the trunk control marker TCM and the register REG access circuit. The call is completed as described under "local call" with resetting to the incoming trunk through the line link stage LL and the common multiple M. Ringing and feeding the called line is effected from the trunk repeater in trunk TRK.

*Transit call*

On a transit call, information is obtained from the number decoder ND and a trunk TRK in the desired route is connected over the trunk link TL.

FIG. 11 shows the same arrangement as FIG. 10, but with the addition of means MM for the interaction of different 1,000-line blocks. In this case, a line marker access circuit LMA is utilized for connecting line markers to information channels and associated number decoders.

While the principles of the invention have been described above in connection with specific apparatus and applications, it is to be understood that this description is made only by way of example and not as a limitation on the scope of the invention.

We claim:

1. A switching contact network for interconnecting a plurality of subscriber stations and trunks,
   said network comprising a plurality of line link switching circuits,
   line means for coupling said subscriber stations to said line link switching circuits,
   trunk switch means coupled to said trunks,
   switching matrix means interconnecting said trunk switch means and said link circuits,
   said switching matrix comprising a group of common multiples in said line link switching circuits,
   each of said common multiples being common to a group of said subscriber stations, and
   means for dividing said common multiples to separate said common multiples from said line means.

2. The switching network of claim 1 wherein means are provided for interconnecting subscriber stations having the same common multiple.

3. The switching network of claim 2 wherein link multiple means are provided for interconnecting the common multiples in said group of multiples.

4. The switching network of claim 3 wherein said link multiple means are two way links.

5. The switching network of claim 4 comprising register access means, register means connected to said register access means, means responsive to the origination of a call for connecting said register access means to said common multiple, means responsive to the connection of said of register access means for transmitting dial tone from said register means, and means for seizing a called trunk responsive to supervisory signals received over said common multiple.

6. The switching network of claim 5 wherein said trunk means comprise matrix means including a group of common multiples for interconnecting trunks on transmit calls.

7. The switching network of claim 6 including means for connecting said register to a calling one of said subscribers over one of said line links and means for connecting the call over another one of said line links.

References Cited

UNITED STATES PATENTS

| | | | |
|---|---|---|---|
| 2,957,047 | 10/1960 | Wennemer | 179—22 |
| 3,313,888 | 4/1967 | Ohno | 179—22 |
| 3,345,465 | 10/1967 | Nogami et al. | 179—22 |

KATHLEEN H. CLAFFY, *Primary Examiner.*

LAURENCE A. WRIGHT, *Assistant Examiner.*